United States Patent [19]

Lenormand et al.

[11] Patent Number: 4,965,588

[45] **Date of Patent: * Oct. 23, 1990**

[54] ELECTRONICALLY SCANNED ANTENNA

[75] Inventors: Régis Lenormand, Toulouse; Antoine Clérino, Cugnaux; Jacques Néron, Toulouse; Jean-Philippe Marre, Cugnaux; Gérard Raguenet, Portet S/Garonne, all of France

[73] Assignee: Societe Anonyme dite : Alcatel Espace, Courbevoie, France

[ * ] Notice: The portion of the term of this patent subsequent to Oct. 23, 2007 has been disclaimed.

[21] Appl. No.: 325,716

[22] Filed: Mar. 20, 1989

[30] Foreign Application Priority Data

Mar. 18, 1988 [FR] France ................................ 88 03544

[51] Int. Cl.[5] .................................................. G01S 7/03

[52] U.S. Cl. ...................................... 342/372; 342/373

[58] Field of Search ............... 342/352, 354, 368, 371, 342/372, 374, 376, 377

[56] References Cited

U.S. PATENT DOCUMENTS

| | | | |
|---|---|---|---|
| 3,737,899 | 6/1973 | Georgopoulos . | |
| 3,993,999 | 11/1976 | Hemmi et al. | 342/372 X |
| 4,090,199 | 5/1978 | Archer . | |
| 4,217,587 | 8/1980 | Jacomini . | |
| 4,277,787 | 7/1981 | King . | |
| 4,799,065 | 1/1989 | Thompson | 342/372 X |
| 4,825,172 | 3/1989 | Thompson | 342/373 X |
| 4,827,268 | 5/1989 | Rosen | 342/368 |
| 4,864,311 | 9/1989 | Bennett et al. | 342/368 |

FOREIGN PATENT DOCUMENTS

| | | |
|---|---|---|
| 2919628 | 11/1979 | Fed. Rep. of Germany . |
| 3336196 | 4/1984 | Fed. Rep. of Germany . |
| 62-203403 | 8/1987 | Japan . |

OTHER PUBLICATIONS

Patent Abstracts of Japan, vol. 12, No. 60 (E-584)(2907) Feb. 23, 1988.

*Primary Examiner*—Thomas H. Tarcza
*Assistant Examiner*—Tod Swann
*Attorney, Agent, or Firm*—Sughrue, Mion, Zinn, Macpeak & Seas

[57] ABSTRACT

The invention relates to an electronically scanned antenna comprising an array (11) of elementary sources, an energy-focusing reflector (10), and feed and control electronics; the array (11) is situated in the focal zone of the reflector, while the feed and control electronics includes a plurality of attenuator and phase shifter circuits (24) controlled by a control unit (27), with said circuits having their outputs connected to at least one combiner (28). The invention is particularly suitable for space telecommunications.

6 Claims, 6 Drawing Sheets

ELECTRONICALLY SCANNED ANTENNA

The invention relates to an electronically scanned antenna.

BACKGROUND OF THE INVENTION

A work entitled "telecommunications spatiales" in the telecommunications scientific and technical collection published by Masson, 1982, and in particular vol. I thereof at pp. 92 to 94 and pp. 259 to 261, describes firstly the grouping together of a plurality of antennas which are fed simultaneously from a common transmitter with interposed power dividers and phase shifters, with the characteristics of said group of antennas depending both on the radiation pattern of each antenna and on the way in which power is distributed between them in amplitude and in phase. This property is made use of for obtaining a radiation pattern which cannot be obtained using a single radiating source. Further, if the characteristics of the power dividers and of the phase shifters are modified by electronic means, the radiation pattern can be changed quasi-instantaneously. The simplest way of grouping together radiating sources is to constitute an array in which all of the sources are identical and are offset relative to one another merely in translation. This can give rise, in particular, to arrays which are rectilinear or plane.

The above document also describes the use of antennas having reflectors for generating multiple beams, thereby obtaining a saving in weight and making it possible to provide large radiating areas by using deployable structures. In general, this type of antenna is used when it is desired to generate a plurality of narrow beams. In general, the reflector illuminating system is offset relative to the center of the reflector in order to avoid masking any of the radiating aperture. Any masking of this aperture gives rise to an increase in the level of secondary lobes, and this must be avoided at all costs in this type of application. The main reflector may be a paraboloid, for example. The multiple beams are obtained by placing a set of illuminating sources in the vicinity of the focus, with each source corresponding to one of the beams. Since the sources cannot be located exactly at the focus, illumination is not geometrically perfect and as a result phase aberrations arise which degrade the radiation performance somewhat. The following are observed: the radiation pattern is deformed; there is a loss of gain relative to the gain which could be obtained at the focus; and parasitic secondary lobes arise. The greater the curvature of the reflector and the greater the distance from the focus, the greater the resulting degradations. As a result, reflectors must be made as "flat" as possible, i.e. with a large ratio of focal length to aperture diameter. This gives rise to structures which are large in size, thereby raising problems of accuracy and mechanical strength. In addition, mutual parasitic coupling may arise between the various sources, thereby giving rise to additional secondary lobes.

In space, applications which require the radiated beam to be electronically deflected over a wide field of view give rise to angular deflections of several beam widths. Consequently, it is essential to be able to monitor the shape of an antenna's radiation pattern accurately. The configuration of such large antennas must also take account of several system aspects:

volume in a satellite is limited so a given antenna must transmit and receive simultaneously;

the mechanical deployment facility must be compatible both with the platform during operation and with storage on the launcher before operation;

good temperature control; and there may be multiple missions and users.

The object of the invention is to solve these various problems.

SUMMARY OF THE INVENTION

To this end, the present invention provides an electronically scanned antenna including an array of elementary sources, feed and control electronics, and an energy-focusing reflector with the array being situated in the focal zone of the reflector, the feed and control electronics comprising:

hybrid couplers each corresponding to a respective one of the elementary sources;

amplifier circuits;

beam-forming circuits each constituted by an adjustable phase shifter and an adjustable attenuator individually controlled by a control unit; and at least one combiner constituted by a set of hybrid junctions for delivering a useful output signal corresponding to a given beam.

The, or each, combiner is constituted by set of hybrid junctions whose outputs are combined in pairs until the, or each, useful output signal is obtained.

Advantageously, the feed electronics includes a switching device.

The proposed solution is of the electronically scanned type. It is constituted by an array which synthesizes the electromagnetic field in the focal zone of a reflector.

Compared with mechanical solutions, the invention has the advantage of not requiring any movement of the source or of the reflector. It enables short focal lengths to be used (compact antennas). It provides a plurality of links simultaneously.

Its advantages over a direct radiation array are the following:

antenna performance is not directly related to the total size of the array; and it is not necessarily disposed on the Earth-facing side of the satellite.

Compared with a single reflector imaging array, the solution of the invention has the following advantages:

the outside dimensions of the array are small; and antenna effectiveness is improved.

Finally, if the proposed solution is compared with a two-reflector imaging array, then the compactness of an antenna in accordance with the invention shows up clearly.

BRIEF DESCRIPTION OF THE DRAWINGS

Embodiments of the invention are described by way of example with reference to the accompanying drawings, in which.

DETAILED DESCRIPTION

Figure 1:
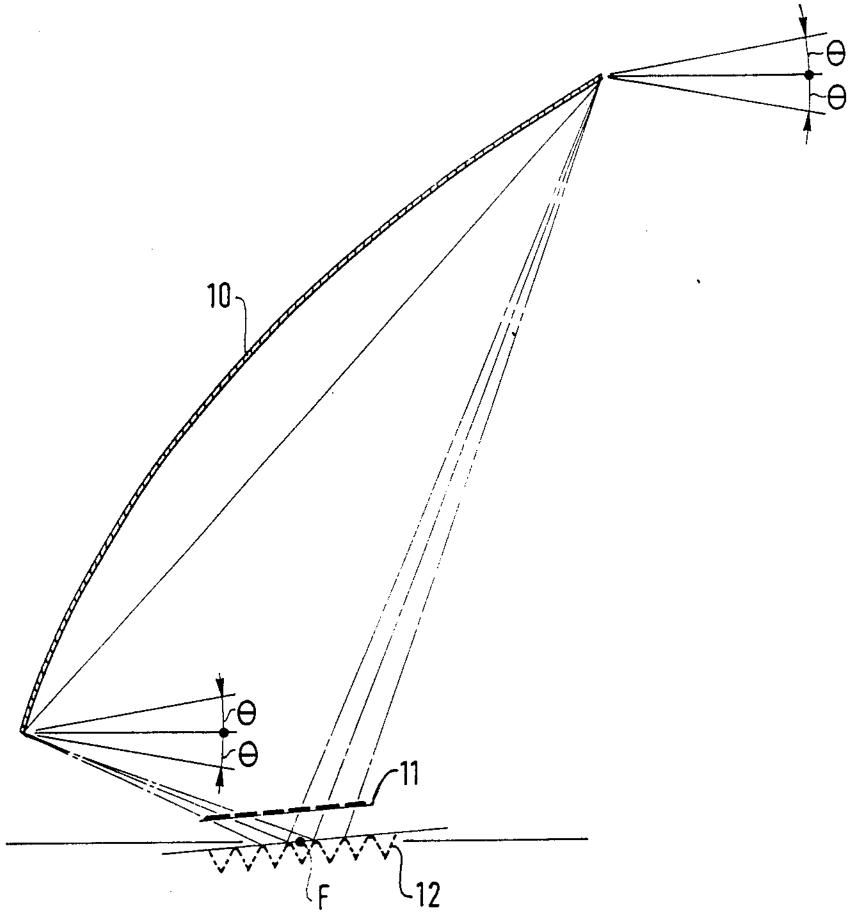
FIG. 1 is a diagram of a scanned antenna in accordance with the invention.

An antenna in accordance with the invention as shown in FIG. 1 comprises a parabolic reflector 10 which is fed excentrically by a plane array 11 of sources situated in the vicinity of the focus F of the reflector, with the array 12 representing the array of virtual sources that corresponds to the array 11.

Figure 2:
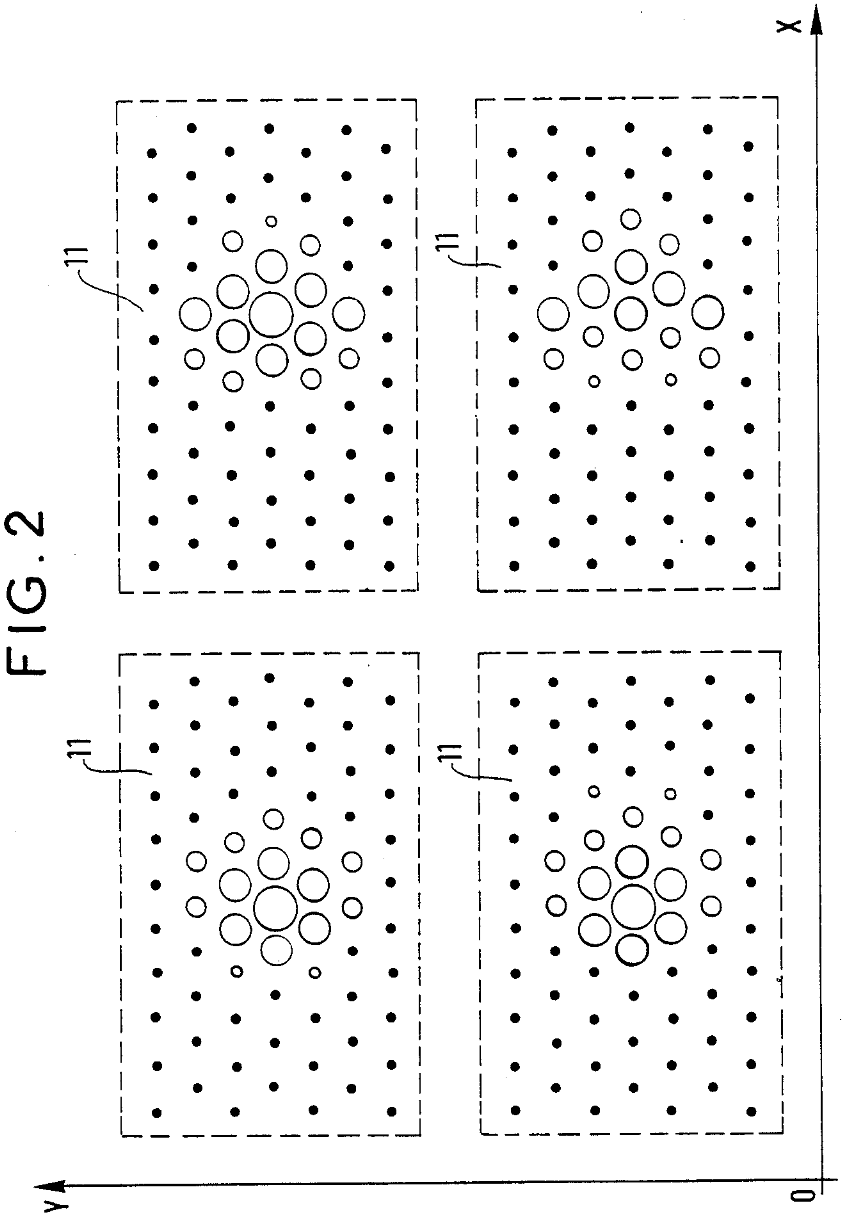
FIG. 2 illustrates the operation of an antenna in accordance with the invention.

FIG. 2 shows an example of various different amplitude distributions for displacements along two directions OX and OY along the array 11 of sources.

The diameters of the disks shown in FIG. 2 represent the amplitudes of the signals received by the various array sources.

When the sensor has a fixed distribution law, the efficiency of the sensor in sensing these various energy distributions cannot be optimal. The same applies to phase distribution.

Thus, if a source is notionally displaced relative to the focus of the reflector, the radiation output of the antenna is degraded.

In an antenna of the invention, the amplitude and the phase of each elementary source is adjusted. This makes it possible to obtain optimum synthesis of each elementary source as though it were located at the focus F of the reflector.

Such operation makes it possible to design an antenna whose gain does not depend on its aiming direction, while nevertheless keeping the reflector 10 and the array 11 of elementary sources fixed.

By using the array 11 of sources, components corresponding to the real distribution are sensed. After filtering and amplification, these components are given phase terms (by variable phase shifters) so as to cancel their differential phases and they are added together in optimum manner by a summing circuit constituted by variable attenuators and hybrid couplers.

The displacement of the amplitude maximum of the field is a function of the scanning angle $\theta$ and also of the distance between the center of the array and the center of the reflector.

The size of the array is deduced from the maximum excursion and from amplitude distribution. This distribution varies as a function of $\theta$ because of aberrations.

Feed by means of such an array makes it possible to synthesize a field distribution which provides the best possible harmonization of the electromagnetic field distribution in the region of the focus F of the reflector 10. More precisely, when the antenna receives signals, this implies that the amplitude coefficients and the relative phase coefficients applied to each elementary source of the array are optimized so as to receive maximum power coming from a particular direction.

The amplitude coefficients and the relative phase coefficients that need to be applied to the elements of the array are calculated by the technique well known to the person skilled in the art of "complex conjugate matching". In order to obtain maximum power transfer between each elementary source in the array and its distribution in the surrounding fields, the overall field distribution over the aperture of the array should be the conjugate of the field distribution in the region of the focus of the reflector.

Controlling the amplitude and the phase of the elementary sources in this way presents numerous advantages since, in theory, any arbitrary field distribution can be synthesized (depending on the spacing between the elementary sources). The common restriction on requiring a large F/D ratio where F is the focal length of the reflector and D is its diameter (for the purpose of reducing aiming error losses due to wrong aiming) can be relaxed, thereby making it possible to optimize the position of the array. These characteristics have a considerable impact on the overall shape of the antenna subsystem. Thus, for example, the array may be mounted directly on one of the faces of the satellite platform in order to facilitate thermal control thereof. Further, a low F/D ratio may be used so as to make it possible to use a reflector which is close to the platform, without giving rise to significant aiming error losses.

Figure 3:
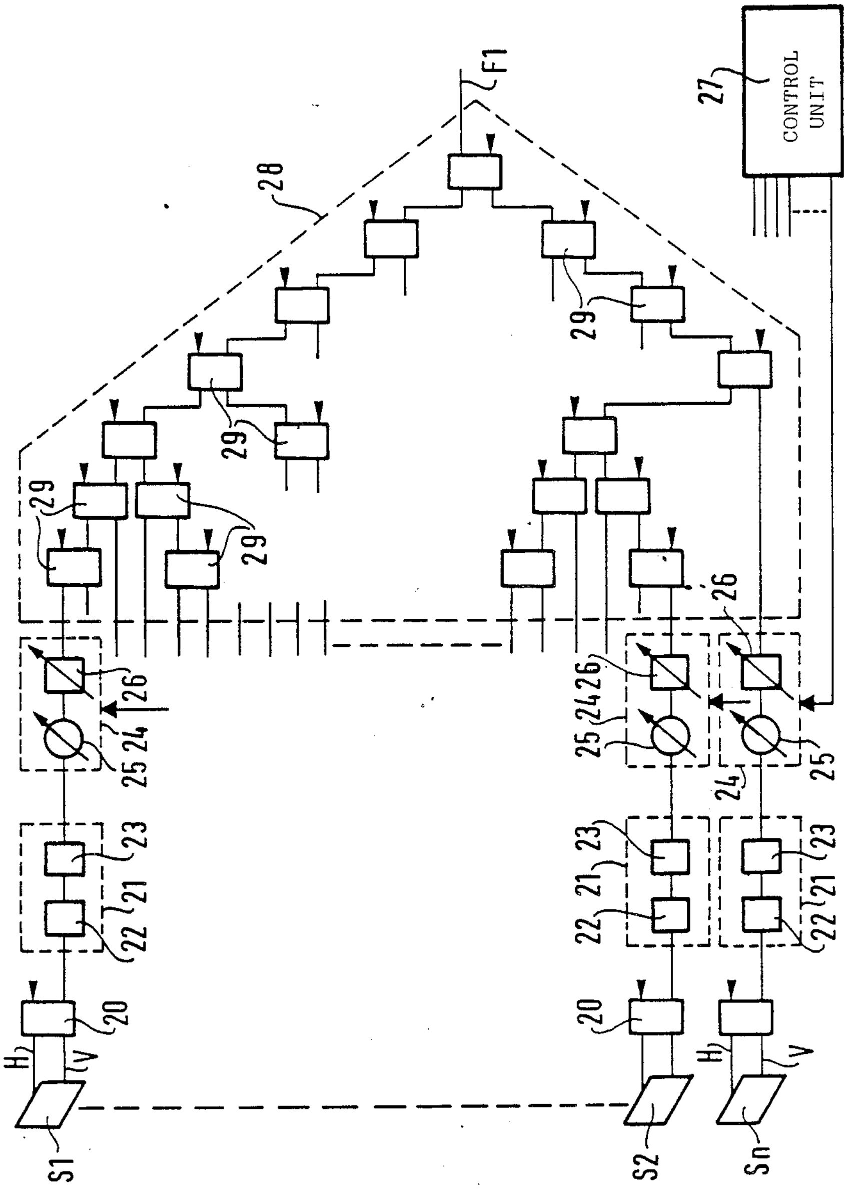
FIG. 3 shows a first embodiment of the control and feed electronics for an antenna in accordance with the invention.

FIG. 3 shows a first embodiment of the electronics for implementing an antenna in accordance with the invention when only one beam is being received.

At the outlet from each elementary source $S_j$, there is a horizontal polarization first outlet H and a vertical polarization second outlet V, both of which are coupled to a hybrid coupler 20 in which circular polarization constituting the sum of the horizontal and vertical polarizations is obtained after shifting one of the signals through 90° in time relative to the other.

The respective signals obtained at the outlets from the hybrid couplers 20 are applied to the inputs of low noise amplifier circuits 21 each constituted by a filter 22 and an amplifier 23 per se, after which the signals are applied to respective beam-forming circuits 24 each constituted by an adjustable phase shifter 25 and an adjustable attenuator 26 individually controlled by a control unit 27. The antenna signals at the outputs from the beam-forming circuits are applied to the inputs of a combining circuit 28 comprising a set of hybrid junctions 29 whose outputs are combined in pairs until a useful output signal F is obtained corresponding to the beam under consideration.

Figure 4:
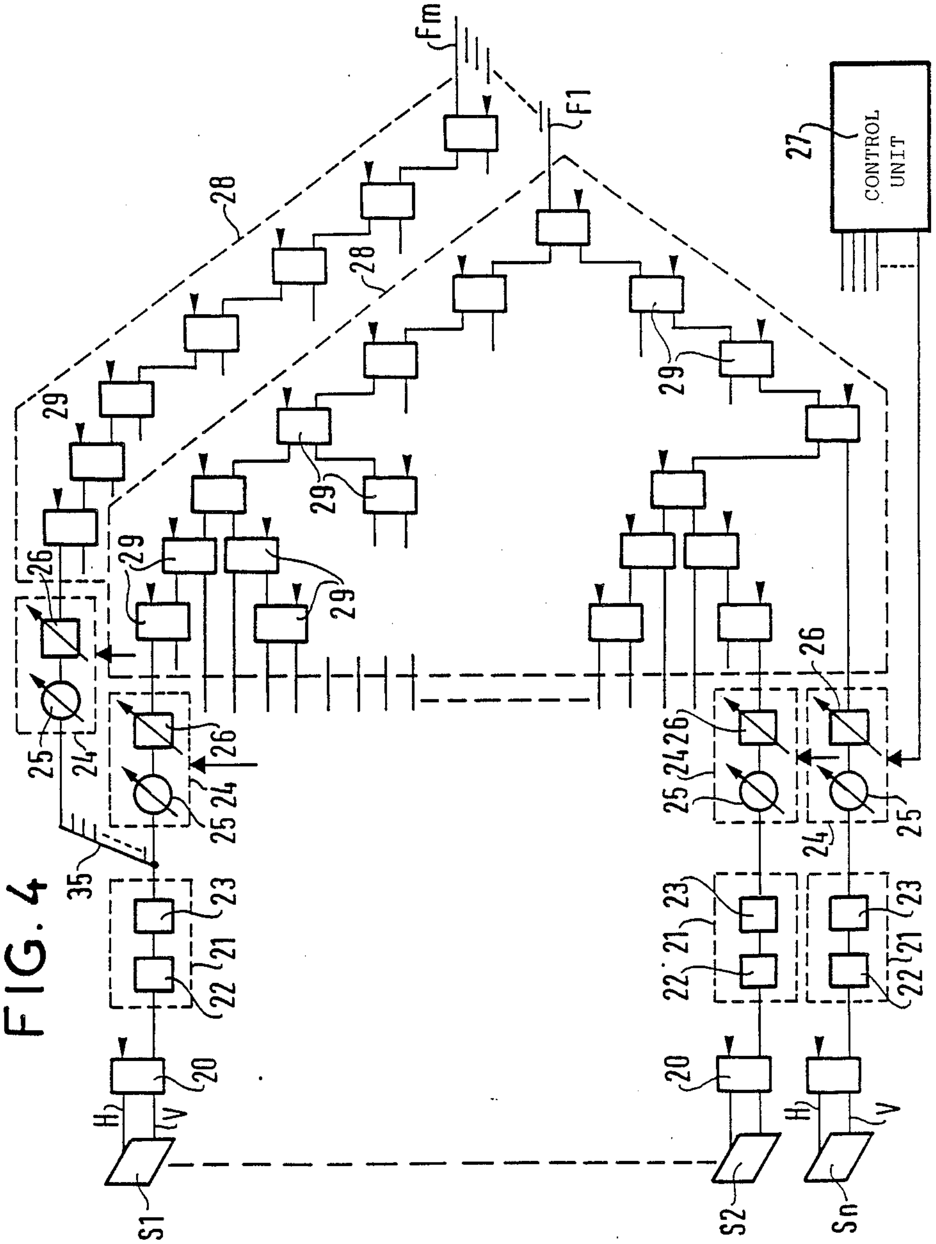
FIG. 4 shows a second embodiment of the control and feed electronics for an antenna in accordance with the invention.

When there are m received beams, then the feed electronics are as shown in FIG. 4.

In this figure, items which are identical to those shown in FIG. 3 are given the same reference numerals.

A low noise amplifier circuit 21 is situated after each of the sources Sj. After being amplified, each signal is divided (35) by the number m of users without significantly degrading the ratio G/T (where G is gain and T is noise temperature).

The beam-forming circuits 24 then adjust the amplitude and phase of each of these signals with the signals then being applied to m power combiners 28 and with a maximum output being obtained after summing. m signals Fl, . . . , Fm are then obtained, each corresponding to one of the beams.

In order to limit the number of paths that need to be added together, it may be observed that for a given direction Θ, only a portion of the array contributes significantly to performance. It is thus possible to use a switching device and make do with summing only a few of the paths. In order to follow the path of a spot over the array, the switching system operates as follows: active circuits corresponding to elementary sources Sp, Sp+l, Sp+q, at state N are subsequently attributed to elementary sources Sr, Sr+q, at state N+l.

A moving body is then tracked as follows:

for small variations, the field matching components are updated (i.e. the amplitude and the phase in each path) in order to maintain the maximum level of directivity pointing towards the moving body;

when the displacement of the spot reaches a certain threshold, the paths are switched so as to keep those elements in operation which are contributing the most to overall gain performance.

Thus, a switching device is disposed between the low noise amplifier circuit 21 and the attenuation and phase shifting circuit 24 in such a manner that only those elements which receive a significant level of power are monitored by an array of reduced size, together with a power combiner, with each beam (or user) being monitored by a group only of the elements rather than by the entire array.

This variant makes it possible to achieve a major saving in weight.

Figure 5:
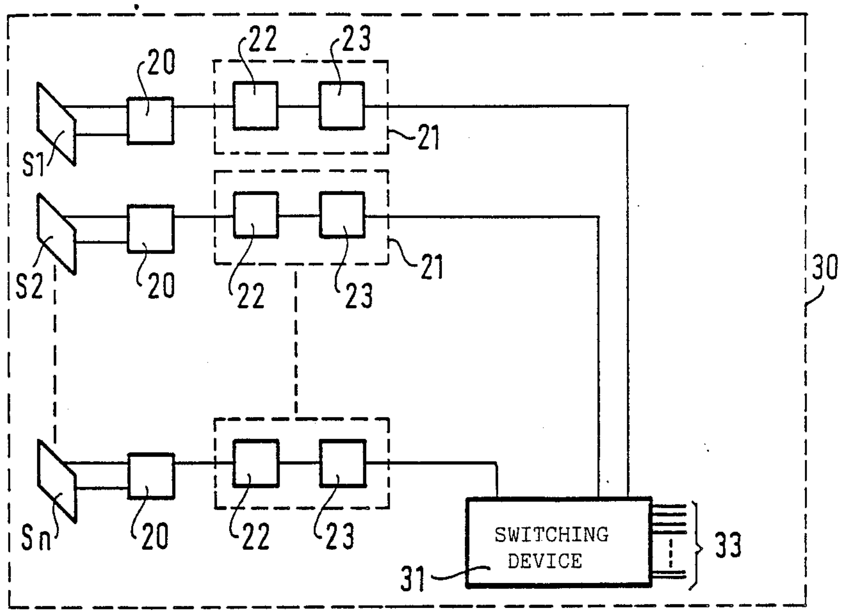
FIGS. 5, 6, and 7 show embodiments of the feed electronics for an antenna in accordance with the invention.

As shown in FIG. 5, which represents a single-beam case the sources Sj followed by their hybrid couplers 20 and their respective low noise amplifier circuits 21 are connected to a switching device 31.

Figure 7:
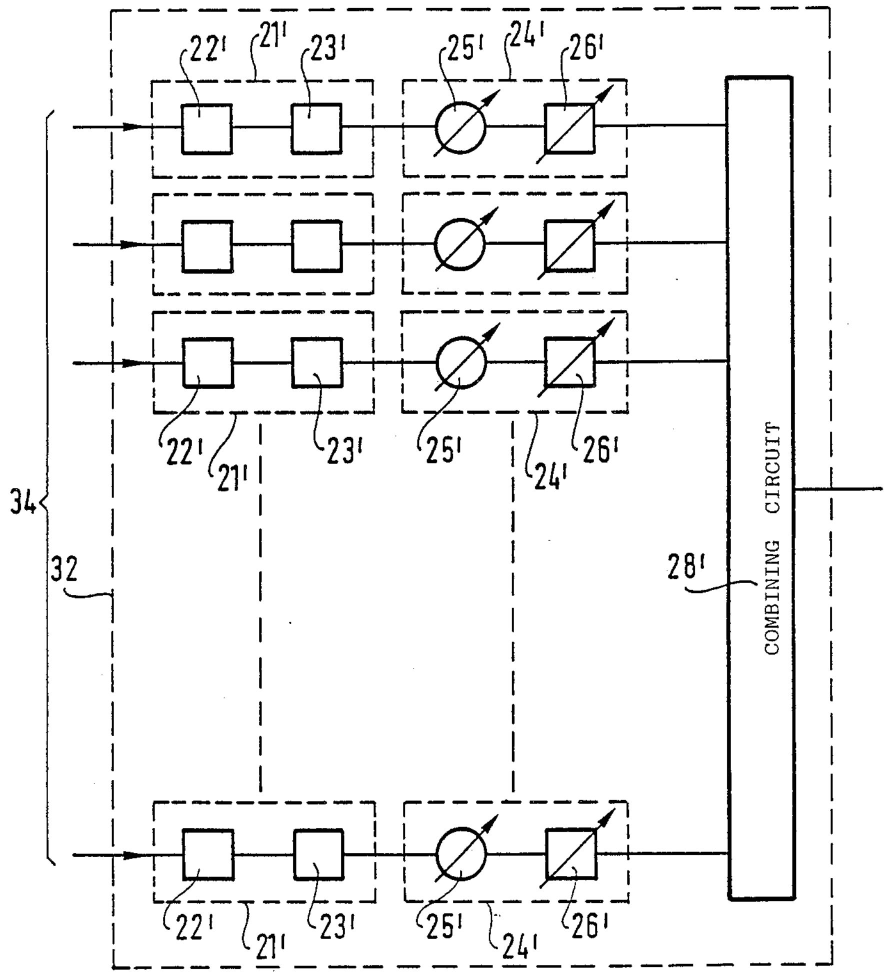

The q outlets (33) of the switching device 31 constitute the inlets (34) to a beam-forming unit 32, shown in FIG. 7 and corresponding to that shown in FIG. 3 except insofar as it requires fewer circuits. In order to distinguish between its circuits and the circuits shown in FIG. 3, corresponding references are given a prime symbol (').

Figure 6:
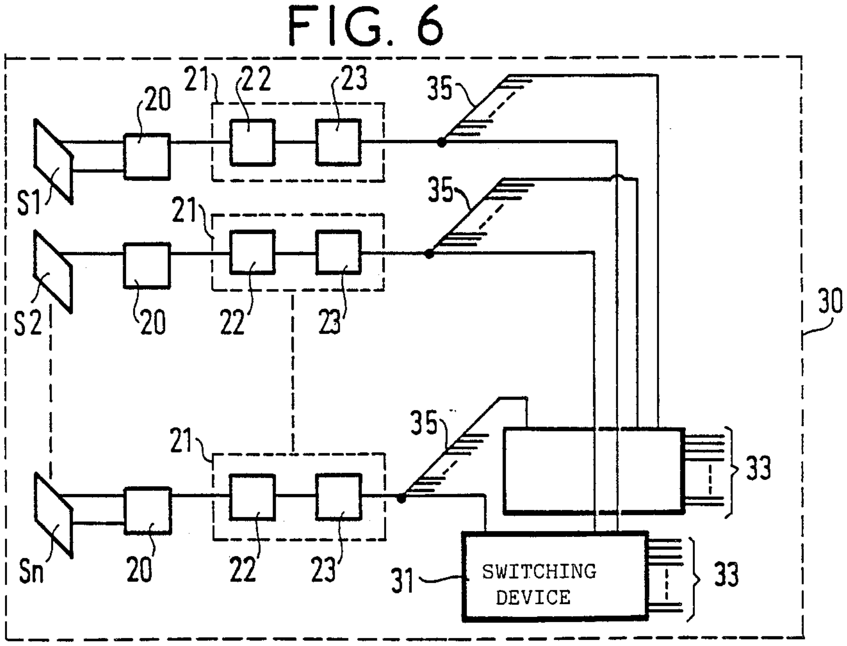

This third embodiment is equally applicable to the case where there are m beams, in which case, dividers (35) are provided at the outlets from the amplifiers (21) and they are followed by m switching devices (31) as shown in FIG. 6. The outputs from each of these m switching devices are connected to m beam-forming units 32.

The operation of the electronically scanned antenna of the invention has been described above for beam reception, however the above description is equally applicable to operating in transmission: however in this case the filters 22 and the low noise amplifiers 23 shown in FIGS. 2, 3, 5, and 7 become power amplifiers 22'' and 23''.

The array 11 of elementary sources may be constituted by an array of "patches" printed on a support, with each of these "patch" elements optionally constituting a multifrequency antenna, e.g. a two-frequency antenna.

Naturally the present invention has been described and shown merely by way of preferred example, and its component parts could be replaced by equivalent parts without thereby going beyond the scope of the invention.

We claim:

1. An electronically scanned antenna including an array of elementary sources, feed and control electronics and an energy-focusing reflector with the array being situated in the focal zone of the reflector, the feed and control electronics comprising:

hybrid couplers each corresponding to a respective one of the elementary sources and each providing a coupler output;

amplifier circuits for amplifying said coupler outputs;

beam-forming circuits receiving the amplified coupler outputs as inputs and adjusting the amplitude and phase thereof, each said beam forming circuit constituted by an adjustable phase shifter and an adjustable attenuator individually controlled by a control unit; and at least one combiner constituted by a set of hybrid junctions for combining outputs of said beam forming circuits to deliver a useful output signal corresponding to a given beam.

2. An antenna according to claim 1, further comprising a switching device disposed at the outputs from the amplifier circuits for providing selected ones of the amplified coupler outputs to said beam forming circuits.

3. An antenna according to claim 2, further comprising dividing means for dividing the output of each amplifier circuit into m signals, and including m said switching devices each receiving an output derived from each amplifier circuit and passing selected amplifier circuit outputs to said beam forming circuits, thereby generating m beams.

4. An antenna according to claim 1, wherein there are m beam-forming units each comprising plural beam-forming circuits followed by a combiner, said antenna further comprising dividing means for dividing the signal at the output from each amplifier circuit into m signals forming inputs to said beam forming units, whereby said beam-forming units provide m separate beams.

5. An antenna according to claim 1, wherein each said coupler receives first and second orthogonal linerarly polarized signals and provides a circularly polarized signal to a respective amplifier circuit.

6. An antenna according to claim 1, wherein said set of hybrid junctions comprises a first stage of junctions for combining respective pairs of beam-forming circuit outputs, a second stage of junctions for combining respective pairs of outputs from said first stage of junctions, and subsequent stages of junctions each for combining respective pairs of outputs from the previous stage, until said useful output signal is obtained.

* * * * *